(12) United States Patent
Herro

(10) Patent No.: US 7,783,463 B2
(45) Date of Patent: Aug. 24, 2010

(54) COMPUTER NETWORKS FOR PROVIDING A TEST ENVIRONMENT

(75) Inventor: Richard Herro, Manasquan, NJ (US)

(73) Assignee: Morgan Stanley, New York, NY (US)

( * ) Notice: Subject to any disclaimer, the term of this patent is extended or adjusted under 35 U.S.C. 154(b) by 845 days.

(21) Appl. No.: 11/528,720

(22) Filed: Sep. 27, 2006

(65) Prior Publication Data

US 2007/0208551 A1  Sep. 6, 2007

Related U.S. Application Data

(60) Provisional application No. 60/721,225, filed on Sep. 27, 2005.

(51) Int. Cl.
*G06F 17/50* (2006.01)
(52) U.S. Cl. .................. 703/13; 709/203; 709/224; 714/28; 714/741
(58) Field of Classification Search ............ 703/13, 703/21; 709/201–203, 220, 223, 224; 714/4, 714/25, 28, 741
See application file for complete search history.

(56) References Cited

U.S. PATENT DOCUMENTS

| 5,907,696 | A * | 5/1999 | Stilwell et al. ............ 703/13 |
| 6,952,779 | B1 * | 10/2005 | Cohen et al. .............. 726/22 |
| 2003/0229695 | A1 * | 12/2003 | Mc Bride ................. 709/224 |
| 2005/0193430 | A1 * | 9/2005 | Cohen et al. .............. 726/25 |
| 2005/0198246 | A1 * | 9/2005 | Kegel ..................... 709/223 |
| 2006/0101516 | A1 * | 5/2006 | Sudaharan et al. ......... 726/23 |

FOREIGN PATENT DOCUMENTS

WO  WO-99-63439  12/1999

OTHER PUBLICATIONS

Shunra Software Press release, Application Performance Over the Networks is No Longer Just the Responsibility of Networking Experts, New Survey Reveals, Feb. 1, 2005, pp. 1-3.*
J. Fritz, Network-modeling tools, Google, Network World, Oct. 2004, pp. 1-6.*
Shunra Software Ltd., Shunra Virtual Enterprise Data Sheet, 2007.
J.L. Marzo et al., "A distributed simulator for network resource management investigation", *Computer Communications* (2003), 26, 1782-1791.

* cited by examiner

*Primary Examiner*—Russell Frejd

(57) ABSTRACT

A computer network for providing a test environment is disclosed. The computer network may include at least one simulated network for simulating at least a portion of the infrastructure of a production network. The computer network may further include a network simulation module in communication with the simulated network for simulating at least one parameter of the production network, and a plurality of client simulation computers in communication with the simulated network via the network simulation module. Each client simulation computer may be configured to replicate at least one of a hardware configuration and a software configuration of a production network client.

21 Claims, 2 Drawing Sheets

COMPUTER NETWORKS FOR PROVIDING A TEST ENVIRONMENT

CROSS-REFERENCE TO RELATED APPLICATION

This application claims priority from the U.S. Provisional Patent Application having Ser. No. 60/721,225 filed Sep. 27, 2005, the disclosure of which is incorporated herein by reference.

FIELD OF THE INVENTION

The present invention is directed generally and in various embodiments to computer networks and, more particularly, to computer networks for providing a test environment.

BACKGROUND

Companies frequently implement and maintain production networks for providing various types of information and services to their clients. Clients may include both clients internal to the company (e.g., managers, sales persons, etc.), as well as clients external to the company (e.g., customers purchasing information and services). Internal clients typically access such computer networks locally using, for example, a company intranet. External clients typically access such networks remotely using, for example, the Internet or a private network connection. Prior to deploying a client application for providing client information and services to a production network, companies typically implement a set of pre-defined procedures for identifying and resolving problems with the application and for generally verifying that the application functions as intended. A test environment within which the application may be deployed for the purpose of implementing such procedures is usually maintained. The test environment may also be utilized for resolving issues with existing client applications or production network infrastructure. Typically, the test environment is deployed within the production network in order to determine the response of the production network to the client application being deployed. Although various measures may be implemented for minimizing potential disruptions to live network traffic and existing client applications operating on the production network in real time, network traffic may nonetheless be inadvertently exchanged between the test environment and the production network. Moreover, deploying a test environment on an existing production network operating with live traffic severely limits the extent to which testing can be performed due to the potential for network saturation and production outages.

Despite the implementation of measures intended to secure the test environment from the production network, exchange of network traffic between the test environment and the production network may cause unintended consequences. Such consequences may include, for example, the disablement of a hardware component or software application within the production network that is necessary for the provision of information and services to clients. Additionally, information pertaining to procedures intended for testing the application within the test environment may inadvertently be communicated to the production environment and interpreted as an actual request by a client for information or a service. In such cases, the consequences may result in substantial financial and/or legal liabilities.

Accordingly, what is needed is a computer network for providing, among other things, a test environment suitable for troubleshooting client issues and testing client applications and infrastructure that is capable of accurate and precise modeling of the production network, but that is also sufficiently isolated from the production network such that consequences such as those described above are avoided.

SUMMARY

In one general respect, this application discloses a computer network for providing a test environment. The computer network may include at least one simulated network for simulating at least a portion of the infrastructure of a production network. The computer network may further include a network simulation module in communication with the simulated network for simulating at least one parameter of the production network, and a plurality of client simulation computers in communication with the simulated network via the network simulation module. Each client simulation computer may be configured to replicate at least one of a hardware configuration and a software configuration of a production network client.

In another general respect, this application discloses a computer network for providing a test environment including a first simulated network and a second simulated network. The first simulated network may simulate at least a portion of the infrastructure of a production network, and the second simulated network may replicate at least a portion of the infrastructure of the first simulated network. The computer network may further include a network simulation module in communication with the simulated networks for simulating at least one parameter of the production network, and a plurality of client simulation computers in communication with the simulated networks via the network simulation module. Each client simulation computer may be configured to replicate at least one of a hardware configuration and a software configuration of a production network client.

DESCRIPTION

Figure 1:
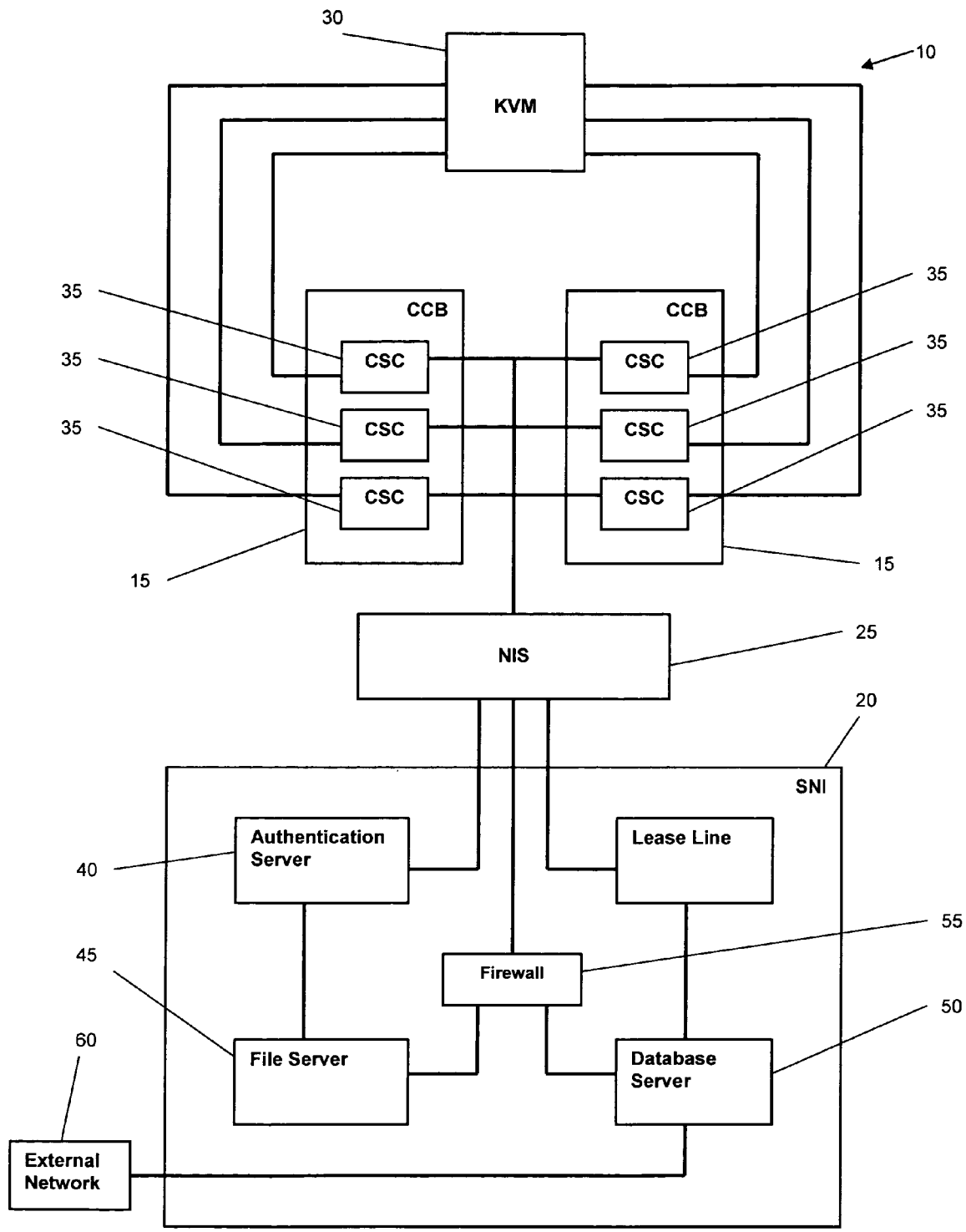
FIG. 1 shows a block diagram of a computer network according to various embodiments of the present invention.

FIG. 1 shows a block diagram of a computer network 10 according to various embodiments of the present invention. According to various embodiments, the network 10 may be operatively configured as an isolated client simulation laboratory for providing an end-to-end testing environment suitable for troubleshooting client issues and testing releases of in client-facing applications and infrastructure prior to deployment on a production network. As shown, the network 10 may include one or more client computer banks (CCBs) 15 in communication with a simulated network infrastructure (SNI) 20 via a network/internet simulator (NIS) 25. The network 10 may further include an access server 30 in communication with each of the CCBs 15.

Each CCB 15 may comprise one or more networked client simulation computers (CSCs) 35 in communication with the SNI 20 via the NIS 25. According to various embodiments, the CSCs 35 may be configured to replicate client computers of an existing production network or client computers of a production network to be tested. Within each CCB 15, each CSC 35 may be configured to replicate commonly-used client hardware and software configurations. For example, the CSCs 35 may be implemented as desktop computers configured in accordance with the software builds and hardware specifications of different computer manufacturers (e.g., IBM, HP, DELL, or other compatible PCs running various versions of Windows, Macintosh running Apple OS, Linux configured machines, and/or Sun Microsystems Workstations running Solaris). The flexibility in the implementation of the CSCs 35 provides a diverse desktop environment that allows for identity between the terminal hardware and software systems of end user client computers and the simulated client side of the test network. This allows accurate replication of the production network client's actual terminal set-up and enables testing and simulation that accurately predicts production network response. The CSCs 35 within a CCB 15 may be commonly located (e.g., within a common room or building) and configured for use at their respective locations. Alternatively, the CSCs 35 may be securely accessed from one or more remotely-located computers (not shown) via the access server 30.

Preferably, the access server 30 is implemented as a keyboard-video-mouse (KVM) server for providing secure KVM-over-IP access from the one or more remotely-located computers to the one or more of the CSCs 35. According to such embodiments, the out-of-band access provided by the KVM server suitably isolates external production networks and other networks from the network 10 such that inadvertent network cross-contamination is prevented. According to various embodiments, the remotely-located computers may comprise a browser-type interface and may be in communication with the access server 30 via the Internet, an intranet, a private network connection, or other suitable network.

The NIS 25 may comprise one or more network appliances (not shown) for enabling communication between the CSCs 35 and between each CSC 35 and the SNI 20. According to various embodiments, the NIS 25 may be operatively configured to simulate various parameters of an existing production network, or of a production network to be tested. Simulated parameters may include, for example, bandwidth parameters, latency parameters, jitter parameters, packet loss parameters, packet fragmentation parameters, and bit error rate parameters. Accordingly, the NIS 25 may be utilized to accurately replicate a variety of network conditions that may appear on a production network. According to various embodiments, the NIS 25 may be implemented utilizing one or more network appliances available from Shunra Software, Ltd, or any other suitable equipment configuration.

Preferably, the SNI 20 is implemented using hardware and software configurations identical or similar to those of an existing production network, or those of a production network to be tested. Accordingly, the SNI 20 is isolated and separated from any actual live production networks, and functions as a dedicated system to accurately replicate and model production network characteristics. As shown in FIG. 1, for example, the SNI 20 may comprise an authentication server 40, a file server 45, and a database server 50.

According to various embodiments, the authentication server 40 may be in communication with the NIS 25 and configured for verifying access credentials (e.g., usernames and passwords) supplied by users of the CSCs 35 prior to granting further access to information or services provided by the SNI 20.

According to various embodiments, the file server 45 may be in communication with the NIS 25 via the authentication server 40 and via a firewall 55. The file server 45 may be configured for hosting one or more applications and/or files to be used by users of the CSCs 35 and for executing one or more programs and/or services necessary to provide desired and/or necessary functionalities. According to various embodiments, for example, the file server 45 may implement applications for providing terminal server functionalities (e.g., Citrix applications), file server software for managing hosted applications and files (e.g., Microsoft Windows Server), and software for supporting Internet-based services (e.g., internet information services (IIS)).

According to various embodiments, the database server 50 may be in communication with the file server 45 and the NIS 25 via the firewall 55 and configured for storing data in one or more formats suitable for use by applications hosted by the file server 45. Additionally, the database server 50 may be configured for storing data in one or more formats suitable for use by applications hosted by computers other than the file server 45, such as, for example, the CSCs 35. As shown in FIG. 1, the database server 50 may be accessible on a restricted basis to one or more networks 60 externally located with respect to the network 10. Such access may be provided, for example, to facilitate administrative and/or data management functionalities such as supplying real data from an existing production network such that the simulation network 20 is capable of accurately simulating the production network. Importantly, data stored within the database server 50, although preferably similar or identical to data used in an existing production network, is separate and distinct therefrom.

It will be appreciated that the above-described components of the SNI 20 and their configuration within the SNI 20 is provided by way of example only, and that the particular components SNI 20 configuration may be modified (and/or other components added) as needed to replicate a variety production networks.

According to various embodiments, each of the components 15, 20, 25, and 30 of the network 10 may be centrally located, such as for example, in a common room or building. According to other embodiments, one or more of the CCBs 15 may be remotely located with respect to the SNI 20, the NIS 25 and the access server 30. In such embodiments, the one or more remotely-located CCBs 15 may be in communication with the NIS 25 and the access server 30 via suitable network connections.

Importantly, the network 10 does not reside within a production network. According to various embodiments, users of the network 10 may only gain access using the CSCs 35 directly, or by accessing the CSCs 35 via the access server 30. Thus, network traffic cannot be inadvertently introduced into, or communicated out of, the network 10. Accordingly, consequences that may otherwise arise due to inadvertent exchange of network traffic between the network 10 and a production network are avoided. For example, inadvertent execution of data or service requests, the disablement of a hardware component or software application within the production network that is necessary for the provision of information and services to clients, and production network saturation and resulting production outages are avoided.

Embodiments of the network 10 may be utilized to perform a variety of tasks for troubleshooting existing production networks and testing new client applications and infrastructure prior to live deployment. Exemplary tasks may include performance benchmarking and tuning, network testing, and desktop compatibility testing prior to production network deployment. Additionally, embodiments of the network 10 may be utilized to prototype topology changes to an existing production system and to perform "war game" testing. Generally, war game testing includes any testing done in an aggressive manner (e.g., hacking, denial of service). War game testing may also include, for example, simulating heavy client loads and identifying any adverse effects to the network 10 resulting therefrom.

Figure 2:
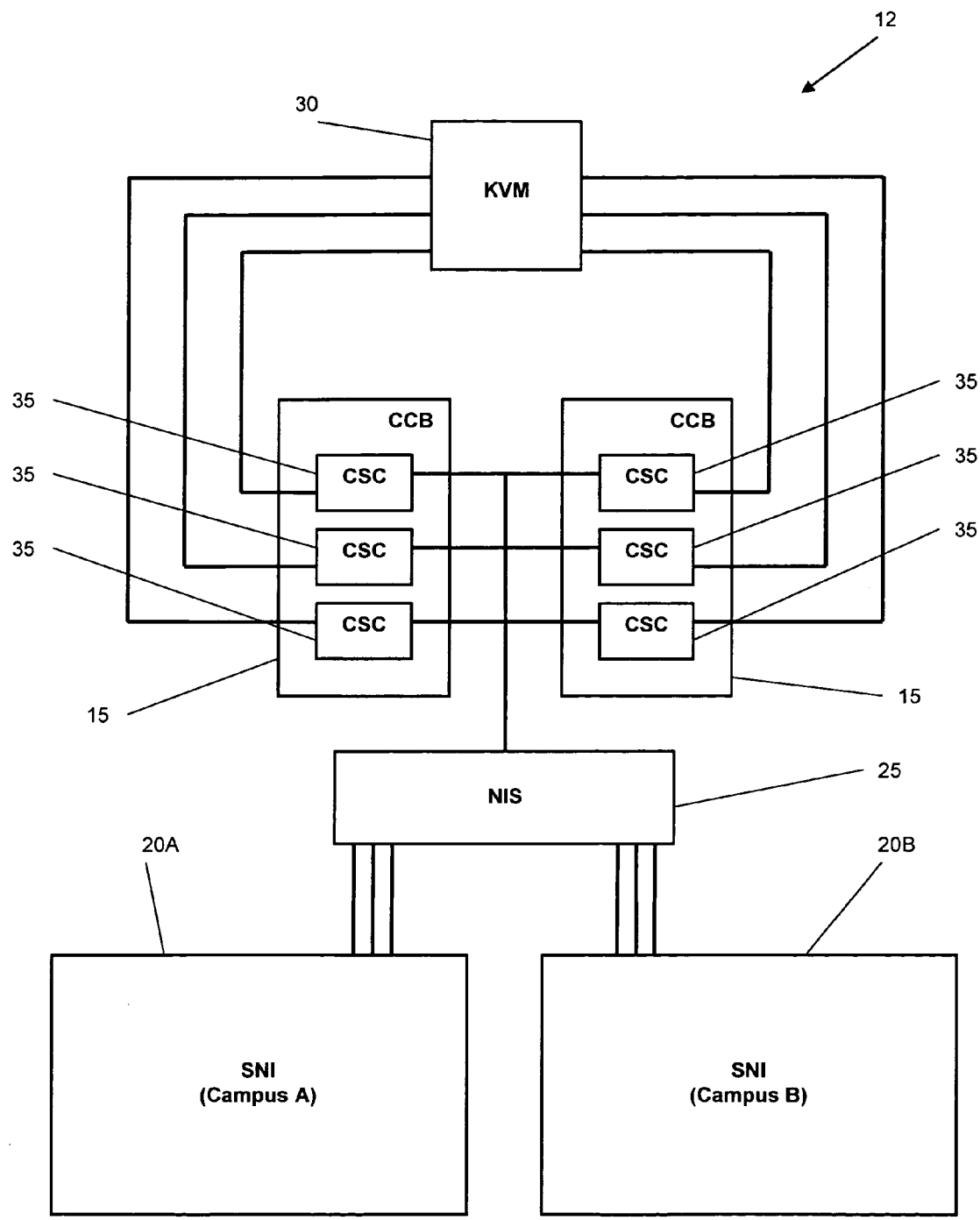
FIG. 2 shows a block diagram of a computer network according to various embodiments of the present invention.

FIG. 2 shows a block diagram of a computer network 12 according to various embodiments of the present invention. The network 12 may be similar to the network 10 in certain respects and may further comprise a backup infrastructure 20B that duplicates some or all of the components and configuration of a SNI 20A. For example, the network 12 may include a first side 20A (Campus A) comprising the SNI 20 as described above, and a second side 20B (Campus B) comprising a duplicate of the SNI 20A. As described below, Campus A and Campus B may be used in conjunction for failover testing, or individually for troubleshooting production network client issues and testing production network code changes, respectively.

According to various embodiments, the dual campus network embodiment of the client simulation test environment may be specifically configured for failover testing. In certain embodiments, for example, a single campus may be utilized to test site-to-site or host-to-host failover (e.g., data loss and back-up contingencies) in the event of a server failure. In other embodiments, the campuses may be utilized simultaneously to test campus-to-campus failover when a component of one of the networks 20A, 20B is caused to fail. For example, if campus A experiences a simulated failure, the test environment may be used to predict the manner in which the back-up campus B responds to the failure. The network 12 is also capable of performing tasks as described above in connection with the network 10 (e.g., benchmarking and tuning, network testing, desktop compatibility testing prior to major turnovers, prototyping of major topology changes, and performance of war games).

When campus-to-campus failover is not being tested, the dual network 12 is divisible into independent two sides. In certain embodiments, one of the sides may be used for troubleshooting production network client issues, and the other may be used for testing code changes prior to production turnover. The functionality of dual network embodiments thus enables tremendous flexibility with respect to client simulation, client technology operations and monitoring, and performance monitoring.

According to various embodiments, the dual network is configured to allow access to both SNI 20A and SNI 20B from any of the CSCs 35, or remotely via the access server 30. This allows further system flexibility by allowing different testing, simulation, and/or modeling operations to be running on the dual network with common terminal control.

As used herein, a "computer" or "server" may be, for example and without limitation, either alone or in combination, a personal computer (PC), server-based computer, main frame, microcomputer, minicomputer, laptop, personal data assistant (PDA), cellular phone, pager, processor, including wireless and/or wireline varieties thereof, and/or any other computerized device capable of configuration for processing data for standalone applications and/or over a networked medium or media. Computers and servers disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

It is to be understood that the figures and descriptions of the present invention have been simplified to illustrate elements that are relevant for a clear understanding of the present invention, while eliminating, for purposes of clarity, other elements, such as, for example, details of specific hardware components. Those of ordinary skill in the art will recognize that simulation of a particular network will dictate what components are used and how they are organized in order to create an appropriate SNI. However, because such elements are well known in the art and because they do not facilitate a better understanding of the present invention, a discussion of such elements is not provided herein.

While several embodiments of the invention have been described, it should be apparent, however, that various modifications, alterations and adaptations to those embodiments may occur to persons skilled in the art with the attainment of some or all of the advantages of the disclosed invention. Therefore, this application is intended to cover all such modifications, alterations and adaptations without departing from the scope and spirit of the disclosed invention as defined by the appended claims.

What is claimed is:

1. A computer network for providing a test environment, the computer network comprising:
    at least one simulated network for simulating at least a portion of an infrastructure of a production network, wherein the at least one simulated network comprises an authentication server, a file server, and a database server;
    a network simulation module in communication with the at least one simulated network, the network simulation module for simulating at least one parameter of the production network;
    a plurality of client simulation computers in communication with the at least one simulated network via the network simulation module, wherein each of the plurality of client simulation computers is configured to replicate at least one of a hardware configuration and a software configuration of a production network client; and
    an access server configured to provide secure access to at least one of the plurality of client simulation computers from at least one computer remotely located with respect to the computer network.

2. The computer network of claim 1, wherein the access server is a keyboard-video-mouse (KVM) server.

3. The computer network of claim 1, wherein each of the plurality of client simulation computers is configured for use at its respective location.

4. The computer network of claim 1, wherein the authentication server is in communication with the network simulation module and configured to verify access credentials supplied by users of the plurality of client simulation computers.

5. The computer network of claim 1, wherein the file server is in communication with the network simulation module and is configured for hosting, for use by the plurality of client simulation computers, at least one of an application, a file, and a service.

6. The computer network of claim 1, wherein the database server is in communication with the network simulation module and is configured for storing data in one or more formats suitable for use by applications hosted by at least one of the file server and the plurality of client simulation computers.

7. A computer network for providing a test environment, the computer environment comprising:

a first simulated network for simulating at least a portion of an infrastructure of a production network;
a second simulated network for replicating at least a portion of an infrastructure of the first simulated network;
a network simulation module in communication with the first and second simulated networks for simulating at least one parameter of the production network; and
a plurality of client simulation computers in communication with the first and second simulated networks via the network simulation module, wherein each of the plurality of client simulation computers is configured to replicate at least one of a hardware configuration and a software configuration of a production network client;
wherein each of the first and second simulated networks comprises an authentication server, a file server, and a database server; and
wherein the first and second simulated networks are configured for failover testing.

8. The computer network of claim 7, wherein at least one of the first and second simulated networks is configured for troubleshooting issues identified by clients of the production network.

9. The computer network of claim 7, wherein at least one of the first and second simulated networks is configured for testing changes to be deployed to the production network.

10. The computer network of claim 7, further comprising an access server configured to provide secure access to at least one of the plurality of client simulation computers from at least one computer remotely located with respect to the computer network.

11. The computer network of claim 10, wherein the access server is a keyboard-video-mouse (KVM) server.

12. The computer network of claim 7, wherein each of the plurality of client simulation computers is configured for use at its respective location.

13. The computer network of claim 7, wherein the authentication server in each of the first and second simulated networks is in communication with the network simulation module and configured to verify access credentials supplied by users of the plurality of client simulation computers.

14. The computer network of claim 7, wherein the file server in each of the first and second simulated networks is in communication with the network simulation module and is configured for hosting, for use by the plurality of client simulation computers, at least one of an application, a file, and a service.

15. The computer network of claim 7, wherein the database server in each of the first and second simulated networks is in communication with the network simulation module and is configured for hosting, for use by the plurality of client simulation computers, at least one of an application, a file, or a service.

16. A computer network for providing a test environment, the computer network comprising:
at least one simulated network for simulating at least a portion of an infrastructure of a production network;
a network simulation module in communication with the at least one simulated network, the network simulation module for simulating at least one parameter of the production network; and
a plurality of client simulation computers in communication with the at least one simulated network via the network simulation module, wherein each of the plurality of client simulation computers is configured to replicate at least one of a hardware configuration and a software configuration of a production network client;
wherein the at least one simulated network comprises an authentication server, a file server, and a database server.

17. A computer network for providing a test environment, the computer environment comprising:
a first simulated network for simulating at least a portion of an infrastructure of a production network;
a second simulated network for replicating at least a portion of an infrastructure of the first simulated network;
a network simulation module in communication with the first and second simulated networks for simulating at least one parameter of the production network;
a plurality of client simulation computers in communication with the first and second simulated networks via the network simulation module, wherein each of the plurality of client simulation computers is configured to replicate at least one of a hardware configuration and a software configuration of a production network client; and
an access server configured to provide secure access to at least one of the plurality of client simulation computers from at least one computer remotely located with respect to the computer network, wherein the access server is a keyboard-video-mouse (KVM) server.

18. A computer network for providing a test environment, the computer environment comprising:
a first simulated network for simulating at least a portion of an infrastructure of a production network;
a second simulated network for replicating at least a portion of an infrastructure of the first simulated network;
a network simulation module in communication with the first and second simulated networks for simulating at least one parameter of the production network; and
a plurality of client simulation computers in communication with the first and second simulated networks via the network simulation module, wherein each of the plurality of client simulation computers is configured to replicate at least one of a hardware configuration and a software configuration of a production network client;
wherein each of the first and second simulated networks comprises an authentication server, a file server, and a database server.

19. A computer network for providing a test environment, the computer network comprising:
at least one simulated network for simulating at least a portion of an infrastructure of a production network;
a network simulation module in communication with the at least one simulated network, the network simulation module for simulating at least one parameter of the production network;
a plurality of client simulation computers in communication with the at least one simulated network via the network simulation module, wherein each of the plurality of client simulation computers is configured to replicate at least one of a hardware configuration and a software configuration of a production network client; and
an access server configured to provide secure access to at least one of the plurality of client simulation computers from at least one computer remotely located with respect to the computer network, wherein the access server is a keyboard-video-mouse (KVM) server.

20. A computer network for providing a test environment, the computer environment comprising:
a first simulated network for simulating at least a portion of an infrastructure of a production network;
a second simulated network for replicating at least a portion of an infrastructure of the first simulated network;

a network simulation module in communication with the first and second simulated networks for simulating at least one parameter of the production network;

a plurality of client simulation computers in communication with the first and second simulated networks via the network simulation module, wherein each of the plurality of client simulation computers is configured to replicate at least one of a hardware configuration and a software configuration of a production network client; and an access server configured to provide secure access to at least one of the plurality of client simulation computers from at least one computer remotely located with respect to the computer network;

wherein the first and second simulated networks are configured for failover testing.

21. A computer network for providing a test environment, the computer network comprising:

at least one simulated network for simulating at least a portion of an infrastructure of a production network, wherein the at least one simulated network comprises an authentication server, an application server, and a database server;

a network simulation module in communication with the at least one simulated network, the network simulation module for simulating at least one parameter of the production network;

a plurality of client simulation computers in communication with the at least one simulated network via the network simulation module, wherein each of the plurality of client simulation computers is configured to replicate at least one of a hardware configuration and a software configuration of a production network client; and an access server configured to provide secure access to at least one of the plurality of client simulation computers from at least one computer remotely located with respect to the computer network.

* * * * *